(No Model.) 3 Sheets—Sheet 1.

A. P. SMITH.
CONNECTING BRANCH SLEEVE AND TAPPING APPARATUS.

No. 419,974. Patented Jan. 21, 1890.

WITNESSES: Alfred Gartner, E. L. Sherman

INVENTOR: Anthony P. Smith, BY Draker Co ATTY'S.

(No Model.) 3 Sheets—Sheet 2.
A. P. SMITH.
CONNECTING BRANCH SLEEVE AND TAPPING APPARATUS.
No. 419,974. Patented Jan. 21, 1890.
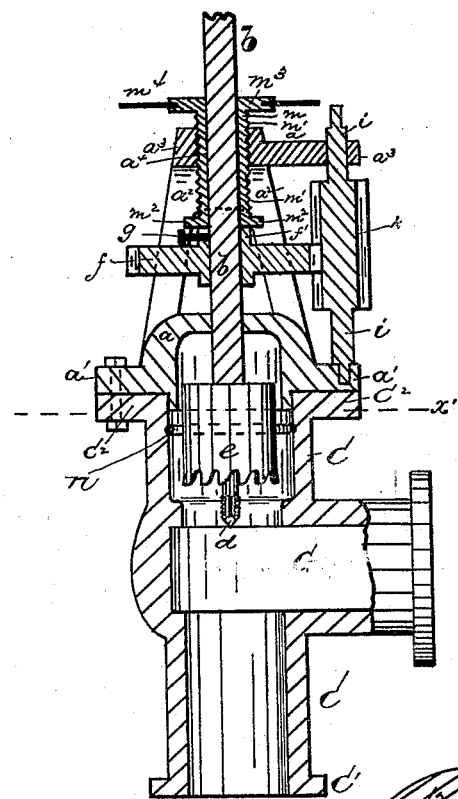
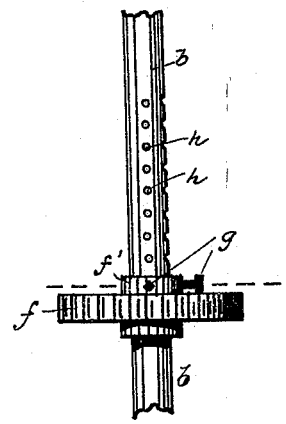
Fig. 9.
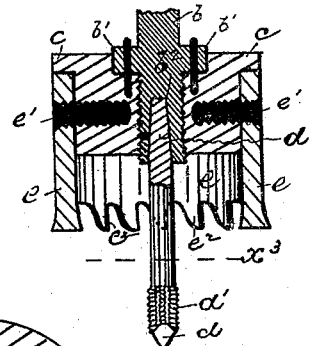
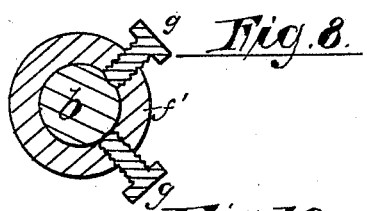
Fig. 8.  Fig. 11.
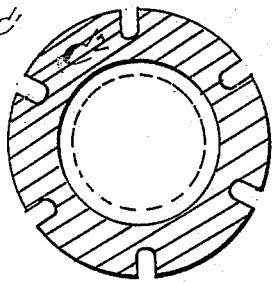
Fig. 10.
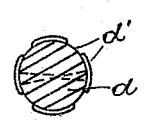
Fig. 13.
WITNESSES: Alfred Gartner, E. L. Sherman
INVENTOR: Anthony P. Smith,
BY Drake & Co. ATTY'S.

(No Model.) 3 Sheets—Sheet 3.

A. P. SMITH.
CONNECTING BRANCH SLEEVE AND TAPPING APPARATUS.

No. 419,974. Patented Jan. 21, 1890.

WITNESSES: Alfred Gartner, E. L. S......

INVENTOR: Anthony P. Smith, BY Drake & Co. ATTY'S.

UNITED STATES PATENT OFFICE.

ANTHONY P. SMITH, OF NEWARK, NEW JERSEY.

CONNECTING BRANCH SLEEVE AND TAPPING APPARATUS.

SPECIFICATION forming part of Letters Patent No. 419,974, dated January 21, 1890.

Application filed December 29, 1888. Serial No. 294,980. (No model.)

*To all whom it may concern:*

Be it known that I, ANTHONY P. SMITH, a citizen of the United States, residing at Newark, in the county of Essex and State of New Jersey, have invented certain new and useful Improvements in Connecting Branch Sleeve and Tapping Apparatus; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

The object of this invention is to avoid, when making connections with water, gas, steam, oil, and other mains, the necessity of shutting off from the main to be cut or tapped the service throughout a more or less extended district adjacent to the point where the connection is to be made, and is an improvement upon the device mentioned in my application for Letters Patent therefor filed November 2, 1887, Serial No. 254,125, duly allowed June 27, 1888, and patented January 15, 1889.

The invention consists in an improved manner of securing the sleeve around and to the main pipe, securing the branch pipe to the sleeve, and in the cutting or tapping mechanism, and in the arrangements and combinations of parts, as will be hereinafter more fully set forth, and finally embodied in the clauses of the claim.

Figure 1:
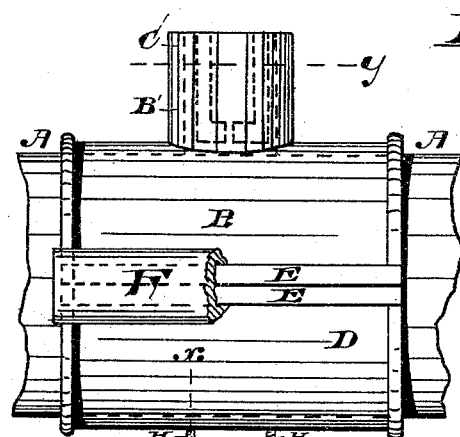
Figure 2:
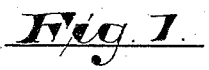
Figure 3:
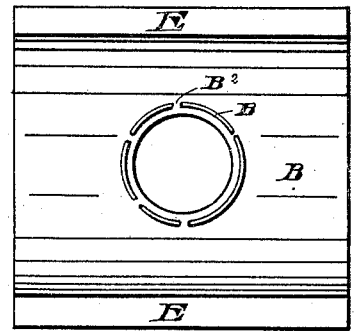
Figure 4:
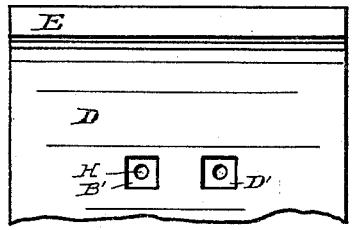
Figure 6:
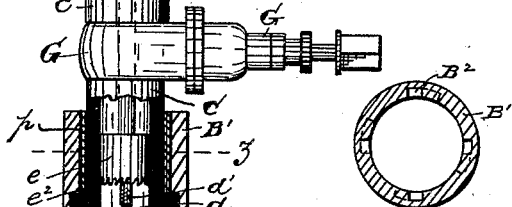
Figures 5, 7:
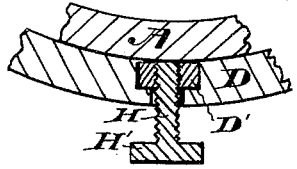
Figure 14:
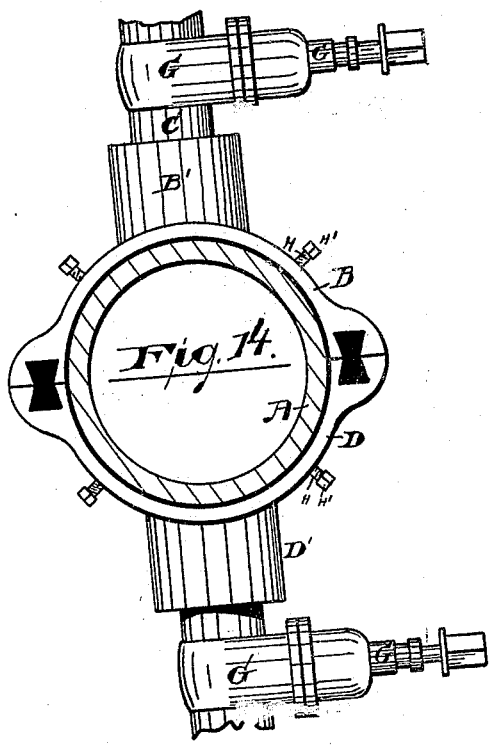
Figure 15:
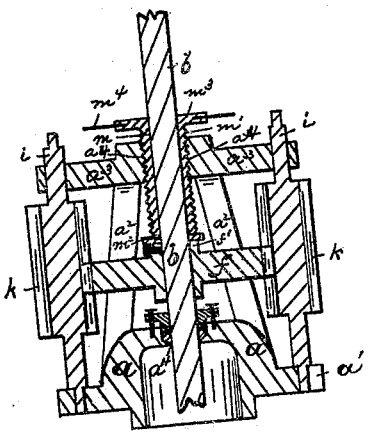
Figure 16:
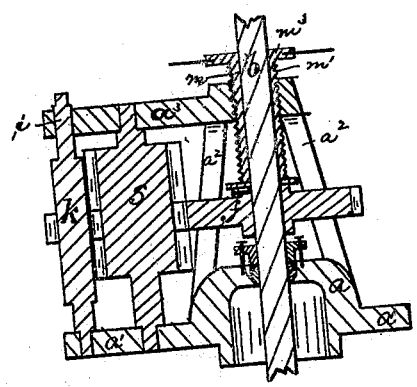

Referring to the accompanying drawings, in which like letters of reference indicate corresponding parts in each of the several figures, Figure 1 is a front elevation of my improved drilling and tapping mechanism with the connections partly in section. Fig. 2 is a side view of a main with a sleeve, the sleeve-fastener being partially broken away. Fig. 3 is an inside view of the upper half of a sleeve. Fig. 4 is an inside view of the lower half of the sleeve, partly broken away. Fig. 5 is a section through line $x$, Fig. 2, showing the device for tightening or securing the sleeve on the main. Fig. 6 is a section through line $y$, Fig. 2. Fig. 7 is a section through line $z$, Fig. 1, with drilling and cutting mechanism removed and showing position of branch in the sleeve before turning so as to lock it. Fig. 8 is an enlarged central vertical section of the upper portion of the tapping mechanism, showing the means of operating the cutters. Fig. 9 is a side view of a portion of the cutter-shaft with gear-wheel and hub. Fig. 10 is an enlarged section through line $x'$, Fig. 9. Fig. 11 is a section of the branch pipe through line $x^2$, Fig. 8, showing the manner of securing the tapping mechanism to the branch pipe. Fig. 12 is a central vertical section of the cutters and the drill and means of securing them to the cutter-shaft. Fig. 13 is a section of the drill through line $x^3$, Fig. 12. Fig. 14 is a similar view to Fig. 1, but showing double branch connections. Fig. 15 is a vertical section of the tapping mechanism, showing two pinions meshing into the gear on the cutter-shaft. Fig. 16 is a similar view of the tapping mechanism, showing an intermediate gear.

In the drawings, A represents the main pipe.

B is the upper half of the sleeve with upwardly-extending hub B', within which is secured the branch-pipe section C.

D is the lower half of the sleeve.

E E are dovetailed flanges on the two halves of the sleeve, and are made slightly tapering.

F F are locking-clamps for holding the two portions of the sleeve firmly together, as shown in Figs. 1 and 2.

G is an ordinary valve-chamber in said branch pipe and made integral therewith and provided with a valve or gate. On the inner periphery of the sleeve portion D are recesses or chambers in which are fitted securely threaded nuts D', Fig. 5. In these nuts work threaded bolts H, with heads H'. These bolts pass through the sleeve and nuts, so as to cause the end of the bolt to bear against the main pipe within the sleeve, as shown fully in Fig. 5.

Upon the outer periphery of the lower end of the branch pipe C are formed lugs or projections C' C', adapted to fit in grooves or notches B² B² on the inner periphery of pipe B', as shown in Figs. 6 and 7.

I I is the packing between the sleeve and the main pipe, as shown in Fig. 1. On the top of the branch pipe C is constructed a flange C², Fig. 8, to which is secured the tapping mechanism when necessary, and which also serves as a means for securing the branch extension when the tapping mechanism is removed when flanged pipe is used.

In the tapping mechanism, $a\ a$ represent the lower part of a frame or holding support, with projecting bottom flanges $a'\ a'$ for securing it by bolts or otherwise to the top of the flange $C^2$ of the branch pipe C. From this lower portion $a$ extend upward vertical supports $a^2\ a^2$, holding the top $a^3$ of the frame, the parts $a$, $a^2$, and $a^3$ being preferably made integral with each other, and the parts $a$ and $a^3$ having central holes $a^4\ a^4$, the hole in $a^3$ being threaded, as will be hereinafter set forth. Within the central holes $a^4$ is fitted and adjusted a cutter-shaft $b$, provided near its lower end with a flange $b'$, Fig. 12, made integral therewith, and to which is secured by screws or bolts a cutter-head $c$. This cutter-head has a central threaded hole to fit upon a threaded portion of the shaft $b$, as shown in Fig. 12. In the lower end of shaft $b$ and extending centrally upward is a socket $b^2$, in which is adjusted and secured a central drill or cutting-tool $d$.

The shank of the drill at its lower end is made a little larger than the upper or main portion and is threaded and slotted, as shown at $d'$ in Figs. 12 and 13, the upper thread serving as a shoulder to hold the piece after it has been cut out of the main pipe by the cutter, as will be hereinafter described.

$e$ is a cutter secured by screws or bolts $e'\ e'$ to the cutter-head $c$, and is of a diameter equal to the size of the hole to be cut out in the main pipe. This cutter is provided with angular cutter-pointed teeth $e^2\ e^2$, and so arranged that in the operation of cutting the cutter shall revolve in the same direction as the screw-thread securing the cutter-head to the cutter-shaft. The cutter-teeth are tapered sharply back to about the depth of the teeth, so as to give clearness to the cutting-teeth and prevent friction.

On the cutter-shaft $b$ and within the supporting-frame is adjustably secured a gear-wheel $f$, with upper extending hub $f'$. (Shown in Figs. 1, 8, and 9.) This gear-wheel is adjustably secured on the shaft by means of screw-bolts $g\ g$, placed at right angles to each other and having their inner ends round or pointed, so as to enter sockets or depressions $h\ h$ on the shaft $b$, as shown in Fig. 9.

Between the upper and lower portions of the supporting-frame and revolving in bearings therein is arranged a shaft $i$, Fig. 8, carrying a pinion $k$, secured thereon or made integral therewith and adapted and arranged to mesh in gear-wheel $f$. This pinion must be made of sufficient length to allow the gear-wheel and the shaft to advance as the cutting progresses, as will be manifest.

$m$, Figs. 1 and 8, is an annular sleeve or collar surrounding the shaft $b$ and having its outer periphery threaded, as at $m'$, so as to fit and turn in the threaded opening $a^4$ in the upper part of the supporting-frame and serve as a feed-screw when drilling or cutting. This sleeve is provided at its lower end with a washer $m^2$, adapted to rest against the top of the hub $f'$ on gear-wheel $f$. On top of the sleeve $m$ is a flange $m^3$, in which are inserted operating-arms $m^4$, Fig. 8. The top of the shaft $b$ is made square and the top of the shaft $i$ is also made square, so as to allow of their being turned by a ratchet-lever in the ordinary manner.

On the inner side of the branch pipe C is formed an annular recess $n$, (shown in Fig. 8,) for the reception of a spigot end and packing material, as a hub or bell, when hub and spigot pipes are used, as is generally the case with water or gas pipes.

In carrying out my invention, after excavating a hole in the ground above and below the main pipe where it is to be tapped, the rust is cleaned off from the main where the opening is to be made, and the two halves of the sleeves are then placed in proper position on the main. The dovetailed clamps F F are then driven firmly over the flanges on the sleeve and the screws or bolts H are then brought tightly against the main, thus rigidly securing the sleeve to the main while the sleeve is being packed and calked on the main. I then put a roll of clay around the lower end of the hub on the sleeve, so as to prevent the molten lead when poured from flowing into the hub while packing the sleeve. I then fill the space between the sleeve and the main pipe with molten lead in the usual manner, as shown at I I, Fig. 1, and calk it around the ends of the sleeve. When this has been done, the bolts H H are then removed. I then calk the lead which has run through the openings in the bottom of the hub and around the main, as shown in Fig. 3, and calk it securely with a calking-iron. The lower edge of the hub, being formed with a rim, serves as a stop-lead in calking the lead at the bottom of the hub. The branch pipe C is then inserted in the hub on the sleeve, the projection C' entering the slots $B^2$. The branch pipe is then turned in the direction indicated by the arrow in Fig. 7, which locks it to the sleeve by a bayonet-joint. I then pour molten lead into the space between the branch pipe C and the hub B' and calk it, so as to form a water-tight packing $p$. (Shown in Figs. 1 and 7.) The valve or gate in the valve-chamber G being then opened, the supporting-frame for the tapping mechanism is then rigidly secured to the flange $C^2$ of the branch pipe, as shown in Fig. 8, with suitable packing, so as to form a water-tight connection between the tapping mechanism and the branch pipe. The outer shaft, with the drill and cutter, is then passed through the valve-opening in the valve-chamber. The drill is then brought into proper position on the main pipe. The gear-wheel $f$ is then moved up on the shaft $b$ as far as possible and then firmly secured thereto by the bolts $g$, Fig. 8. The feed-screw $m$ is then screwed down until the washer $m^2$ on the bottom rests upon the upper side of the hub $f'$ on gear-wheel $f$. I then apply a ratchet-lever to the top of the shaft $b$ and commence drilling and continue feeding and drilling until the drill and tap have been passed through the main. When the point of the drill first passes through the main pipe, the water that escapes at once passes up through the slots in the drill, and any defect in the packing or securing of any portion of the connections will at once be detected and can be remedied before any further cutting is done. Moreover, the water that thus escapes into the valve-chamber serves as a lubricator to the cutting-tool and keeps it cool, thus preventing the temper of the steel of the cutting-tool being injured in any way in the act of cutting, as will be understood. The drill, after passing through the pipe, then acts as a center bearing and steadying-tool during the operation of cutting by the main cutting-tool. The feed-screw is then run back and up to its highest point. The bolts holding the gear-wheel $f$ are then loosened, and the gear-wheel moved up on the shaft to its highest point and firmly secured again, as before described. It will be seen that the shoulder formed by the threads on the tap will prevent the cutter and cutter-shaft from being forced back by the pressure when the feed-screw and gear-wheel are being shifted. I then remove the ratchet-lever from the top of the shaft $b$ and adjust it on the top of the pinion-shaft $i$ and commence cutting, turning the pinion $k$ in a proper direction, so as to give the desired direction to the cutting-tool, and continue cutting and feeding with the feed-screw $m$ as fast as the cutter will carry the cut until the cutter has passed freely through into said main pipe, making a clean smooth hole therethrough, free from burrs, &c., as will be understood.

To remove the piece that has been cut out of the main, the bolts $g$, secured to the gear-wheel, are loosened, and the shaft $b$ and cutting-tool can then be raised through the branch pipe, and with them the piece that has been cut out, it being held in place on the shank of the drill by the upper thread of the screw holding it as a shoulder, the shank of the drill above the thread being a little smaller than the threaded portion, thus making the upper thread of the screw a shoulder to hold the piece. When the cutter with the cut-out piece has passed up through and beyond the valve-chamber, the gate-valve is closed or shut down, the supporting-frame is disconnected from the branch pipe, and the connection is completed, leaving the flanged or hub end of the branch ready and in condition to connect with the pipe leading to a building or elsewhere, as desired.

In adjusting the cutter $e$ upon the shaft the distance between the lower edges of the teeth and the upper thread of the screw on the drill should be a little more than the thickness of the piece to be cut out, so that the upper thread on the threaded portion of the drill which serves as a collar can pass through before the cutter begins cutting.

By constructing and arranging the feed-screw $m$ as herein described I am enabled to readjust for feeding the cutting-tool after the drill and tap have passed through the main and without disturbing any of the other parts of the tapping mechanism.

When a double branch connection is to be made, the sleeve is formed with two hubs and a tapping mechanism applied to each, and both cutting operations can be performed at the same time and without any interference with each other, as shown in Fig. 15.

When cement or other material is used as a packing for the sleeve, I first place a lead ring with nubs in the bottom of the hub on the sleeve and force the nubs into the openings in the bottom of the hub, which keeps the lead ring in place. I then line the two halves of the sleeve with cement and bring them together on the main and drive up the clamp or wedge. This forces out the superfluous cement. When the cement has become thoroughly hard, the bolts H are then removed, and the sleeve is then firmly and evenly seated on the main. I then calk the lead ring around the bottom of the hub in the usual manner with a calking-iron, making a water-tight joint immediately surrounding the branch opening. It will be seen that by thus packing the sleeve, either when lead or cement is used, the sleeve has an even and uniform bearing on the main, and thus greatly strengthens it at and around the opening that is made for the branch.

Having thus described the invention, what I claim as new, and desire to secure by Letters Patent, is—

1. An improved apparatus for drilling and tapping pipes or mains, consisting of a supporting-frame, cutter-shaft, drill and cutting-tool secured to said shaft, the shank of said drill having one series of screw-threads cut upon it and grooved, the thread serving as a shoulder to hold the piece after it has been cut from the main, and means for operating said drill-cutter, said apparatus being provided with any desired means for securing it to the branch pipe, all said parts being arranged and combined as and for the purpose set forth.

2. An improved apparatus for drilling and tapping pipes and mains, consisting of a supporting-frame, cutter-shaft, drill and cutting-tool secured to said shaft, the shank of said drill having a screw-thread upon it and grooved, the upper thread serving as a shoulder to hold the piece after it has been cut from the main, a gear-wheel adjustably secured on said cutter-shaft, pinion-shaft, and pinion meshing into said gear-wheel, and means for operating said pinion, said apparatus being provided with any desired means for securing it to the branch pipe, all said parts being arranged and combined as and for the purpose set forth.

3. The combination of a split sleeve having dovetail flanges and adjusted around a main and held together by a dovetail clamp, a branch C, connected with either of the sections of said sleeve and provided with a gate-valve chamber made integral therewith, and a drilling and tapping apparatus removably secured to the end of said branch, as and for the purpose set forth.

4. The combination of a split sleeve with dovetail flanges and adjusted around a main and held together by a dovetail clamp rigidly securing said sleeve to the main, a branch C, connected with either of the sections of said sleeve and provided with a gate-valve chamber made integral therewith, and a drilling and tapping apparatus removably secured to the end of said branch, as and for the purpose set forth.

5. The combination of a split sleeve having dovetail flanges and adjusted around a main, a dovetail clamp for holding said split sleeve together, a hub B, made integral with either of the sections of said sleeve and having openings at the lower end, as described, a branch C, connected with said sleeve and hub and provided with a gate-valve chamber made integral therewith, projections on the bottom of said branch to lock it to the sleeve by a bayonet-joint, as described, and a drilling and tapping mechanism removably secured to the end of said branch, as and for the purpose set forth.

6. In an apparatus for drilling and tapping mains, means for operating the drill and cutting-tool, consisting of a gear-wheel adjustably secured on the drill-shaft and provided with a hub $f$ on its upper side, a pinion-shaft, and a pinion rigidly secured to or made integral with said shaft and meshing into said gear-wheel, and a crank or ratchet lever for rotating said pinion-shaft, all as described, and for the purpose set forth.

7. In an apparatus for drilling and tapping mains, means for feeding the drill and cutting-tool while the drilling and cutting progress, consisting of an annular feed-screw loosely surrounding the shaft carrying the drill and cutting-tool, threaded upon its outer periphery, and provided with a washer upon its lower end to bear against a gear-wheel secured in said shaft, and a flange upon its upper end for rotating the sleeve, the outer threaded portion of said sleeve engaging in a threaded opening on the top of the frame, as described, and for the purpose set forth.

8. In an apparatus for drilling and tapping mains, a cutting mechanism consisting of a cutter-head secured to the drill-shaft, a cutting-tool removably secured to said cutter-head and provided with cutting-teeth tapering backward, as described, and for the purpose set forth.

In testimony that I claim the foregoing I have hereunto set my hand this 21st day of December, 1888.

ANTHONY P. SMITH.

Witnesses:
OLIVER DRAKE,
E. L. SHERMAN.